United States Patent [19]

Mohr

[11] 3,807,265
[45] Apr. 30, 1974

[54] ELECTRONIC DISPLAY SYSTEM FOR A PAPER GUILLOTINE

[76] Inventor: Rudolf Mohr, Hattersheimerstrasse, 6238 Hofheim/Taunus, Germany

[22] Filed: July 27, 1972

[21] Appl. No.: 275,898

[30] Foreign Application Priority Data
July 30, 1971  Germany............................ 2138111

[52] U.S. Cl...................... 83/278, 83/522, 214/1.6, 340/203, 83/468
[51] Int. Cl............................................. B26d 7/28
[58] Field of Search.................. 83/278, 471.2, 468; 214/1.5, 1.6; 340/203, 259, 190

[56] References Cited
UNITED STATES PATENTS

| 3,661,277 | 5/1972 | Young | 214/1.6 |
|---|---|---|---|
| 3,103,651 | 9/1963 | Heinecke et al. | 340/203 |
| 3,513,741 | 5/1970 | Shallenberg | 83/278 |
| 3,602,348 | 8/1971 | Mohr | 83/522 |

Primary Examiner—Donald R. Schran
Attorney, Agent, or Firm—Holman & Stern

[57] ABSTRACT

Paper guillotines have a guillotine blade, a work-table and a paper feed slide movable over the work-table for feeding paper to the blade. There is also normally a fixed scale associated with the work-table for indicating the position of the feed slide. In order to enable the operator to read off the position of the feed slide without difficulty, there is provided an electronic display system for displaying the position of the feed slide, the display system having electronic elements which move with the feed slide, for scanning values indicated by the scale, and a stationary digital display which displays the position of the feed slide as sensed by the electronic scanning elements.

9 Claims, 2 Drawing Figures

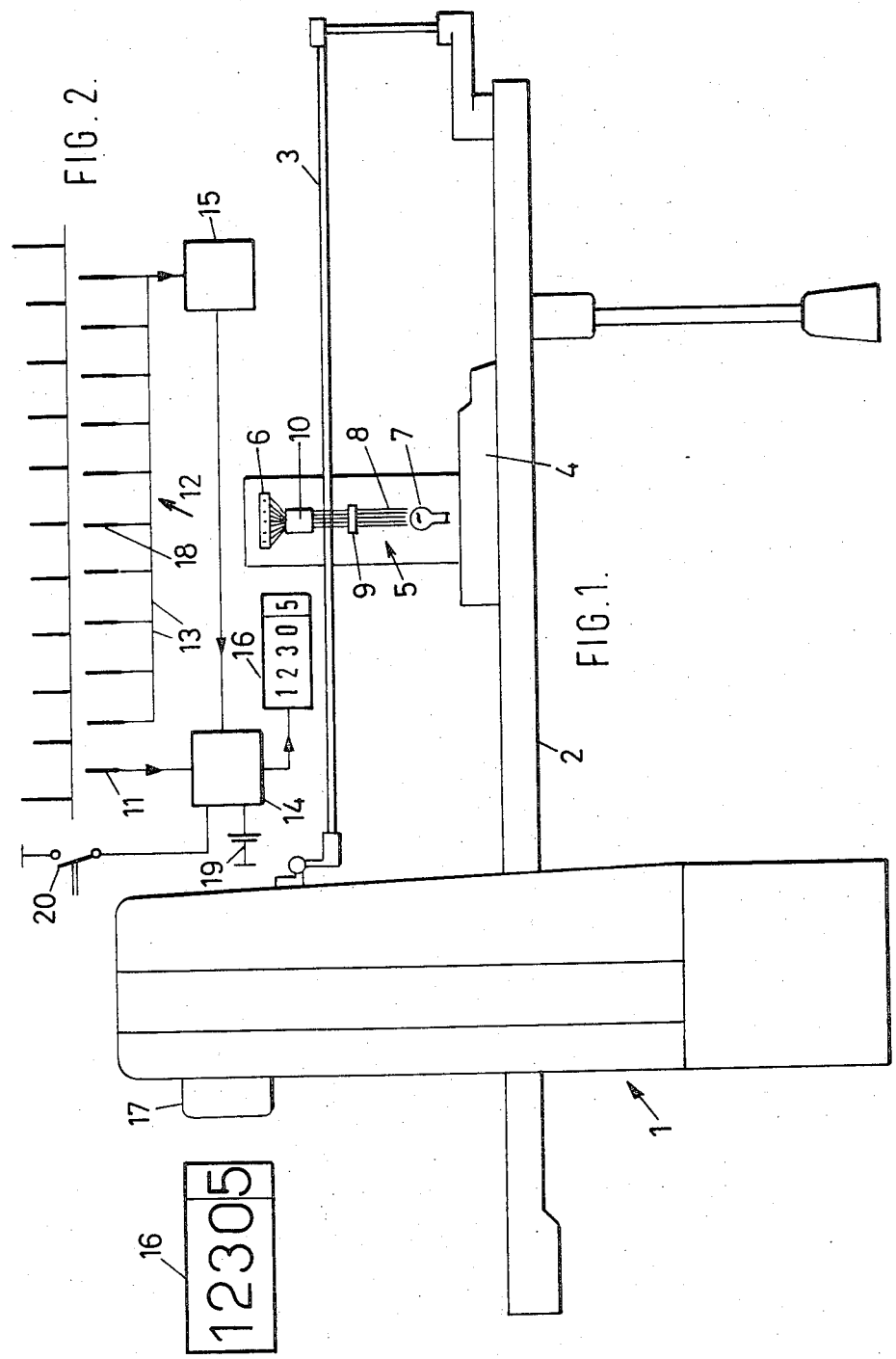

3,807,265

ELECTRONIC DISPLAY SYSTEM FOR A PAPER GUILLOTINE

BACKGROUND OF THE INVENTION

This invention relates generally to paper guillotines and more particularly, it relates to an electronic display system for displaying the position of a feed slide of a paper guillotine.

The prior art discloses paper guillotines with a stationary scale disposed over the work-table and provided with reading means which move together with the feed slide to read values indicated by the scale - these values are normally graduations of scale. In this case, the graduations of the scale appear on a ground-glass screen in enlarged form so that the operator is able to observe the graduations travelling at a specific speed over the ground-glass screen while the feed slide is moved.

This optical indication suffers from the disadvantage that the operator may become disturbed or confused when observing the motion of the ground-glass screen.

German Auslegeschrift 1,095,252 discloses means for reading the values indicated by a scale disc on a ground-glass disc or screen which is fixed to the machine frame. In this case, a cord drive reduces the speed of the scale disc to a half-speed at which the numerical values are projected on a ground-glass screen. With this device, it is possible for the numerical values to appear at a fixed reading position but it suffers from the disadvantage that changes of length occur in intermediate elements such as the cord, due to mechanical, temperature or other effects so that there is no precise indication of the actual distances travelled by the feed slide.

SUMMARY OF THE INVENTION

The present invention provides an electronic display system for displaying the position of a feed slide of a paper guillotine having a fixed scale associated with a work-table thereof, the display system having electronic elements arranged to be driven by the feed slide for moving over the scale, for scanning values indicated by the scale, and a digital display which is arranged to be stationary, for displaying a reading corresponding to the position of the feed slide. The invention extends to a paper guillotine having a work-table, a feed slide, a fixed scale for indicating the position of the feed slide, and an electronic display system of the invention, the electronic elements being driven by the feed slide to move over the scale, for scanning values indicated thereby, and the digital display being stationary. The indicated values can thus be displayed accurately at a stationary reading position.

The electronic elements preferably comprise a main element for coarse indication and a plurality of individual elements, combined to form an electronic vernier, for fine indication.

The electronic elements may be disposed on a ground-glass screen arranged to be driven by the feed slide for moving over the scale, and the arrangement can include an optical system for projecting the scale values (normally the graduations) on the guillotine scale onto the ground-glass screen in an enlarged form. This enables the accuracy of measurement to be increased to the degree required in practice, and enables the scale indications to be transferred to the electronic display system as accurately as possible by the electronic elements on the ground-glass screen.

In general, the scale values may be projected onto the ground-glass screen and can be directly scanned by the electronic elements, signals corresponding thereto being passed to the digital display in a substantially inertia-free manner.

The precise position of the feed slide relative to the guillotine blade can be fed into the system by supplying a signal to the system which corresponds to the precise position; thus, the system can have a switch which can be closed to supply the signal to counting and storage means.

The digital display may be disposed in a housing on the front of the guillotine.

If, as is usual, the guillotine is electrically actuated, the display system may be arranged such that it can remain electrically energized when the guillotine is switched off; thus the display system can have an additional, independent power supply source such as a battery.

BRIEF DESCRIPTION OF THE INVENTION

One embodiment of the invention is particularly described, by way of example, with reference to the accompanying drawing, in which:

FIG. 1 is a schematic view of a paper guillotine having an electronic display system in accordance with the invention; and FIG. 2 is a schematic view of the electronic display system.

DETAILED DESCRIPTION OF THE PREFERRED EMBODIMENT

FIG. 1 shows a paper guillotine 1 provided with a stationary, transparent scale 3 which extends over a work-table 2 of the guillotine. A feed slide 4 supports an optical system 5 and a ground-glass screen 6. Conventional means are used to mount the optical system 5 and the screen 6 and to fixedly connect them to the feed slide 4. Rays 8 pass from a light source 7, through a condenser 9, through the transparent scale 3, through a lens 10, and project the transversed range of the scale 3 at the appropriate magnification onto the ground-glass screen 6.

As shown in FIG. 2, a main electronic element 11 and a plurality of electronic elements 13 are combined to form an electric vernier 12 and are disposed on and fixedly connected to the ground-glass screen 6.

The main element 11 is associated with a counter and storage unit 14, while the electronic vernier 12 is connected to an evaluating unit 15.

A range of 1,230 mm – 1,240 mm may, for instance, be visible on the ground-glass screen 6 in the present embodiment. A digital display 16, disposed in a housing 17 on the front of the guillotine 1, is connected to the counter and storage unit 14.

The method of operation of the electronic display system is as follows:

In the drawing, the feed slide 4 is in a position on the work-table 2 corresponding to the value 1,230.5 mm of the graduations on the scale 3. As shown in FIG. 2, this range is visible on the ground-glass screen 6 so that the electronic elements 11, 13 are able to measure and scan the range. The main element 11, which is adapted to indicate whole millimeters, is therefore disposed in the middle between 1,230 mm and 1,231 mm. Accordingly, it feeds this value to the counter and storage unit 14.

At the same time the fifth element 18 of the electronic vernier 12 is in alignment with the scale graduation 1,235 mm, that is to say the electronic vernier 12 feeds the value 0.5 mm into the evaluation unit 15. This value is transferred by the evaluation unit 15 to the counter and storage unit 14. The counter and storage unit 14 combines the values supplied by the main element 11 and the vernier 12 to transfer them to the digital display 16. The precise position of the feed slide 4, corresponding to the indicated value 1,230.5 mm, will become visible on the digital display 16.

If the feed slide 4 moves, the digital display 16 will indicate the substantially instantaneous position of the feed slide 4, signals corresponding to the portion of the feed slide 4 having been passed to the digital display 16 in a substantially inertia-free manner.

The counter and storage unit 14 is also connected to its own power supply 19 so that the values fed into the counter and storage unit 14 are retained when the guillotine is switched off. To enable the precise position of the feed slide 4 relative to the guillotine blade to be utilized as a reference point when the device is installed, the electronic display system is provided with a switch 20 which feeds a signal corresponding to the aforementioned precise position into the counter and storage unit 14 when the switch 20 is closed.

I claim:

1. In a paper guillotine comprising a guillotine blade, a work-table, a paper feed slide movable over said work-table for feeding paper to said blade, and a fixed scale associated with said work-table for indicating the position of said feed slide, wherein the improvement comprises an electronic display system for displaying the position of said feed slide, said display system comprising electronic elements for driving over said fixed scale by said feed slide for scanning values indicated by said fixed scale and providing signals corresponding to the scanning values, means for connecting fixedly said electronic elements to said feed slide thereby constraining said electronic elements to move in the same direction as and at the same speed as said feed slide, a stationary digital display for displaying a reading corresponding to the position of said feed slide, and electronic means for actuating said digital display being responsive to said signals given by said electronic elements.

2. A display system as claimed in claim 1, further including a ground-glass screen driven by said feed slide to move over said fixed scale, said electronic elements being disposed on and fixedly connected to said ground-glass screen.

3. A display system as claimed in claim 2, wherein scale values projected onto said ground-glass streen are directly scanned by said electronic elements, and said signals corresponding thereto are passed to said digital display in a substantially inertia-free manner.

4. A display system as claimed in claim 1, wherein said electronic elements comprise a main element for coarse indication and a plurality of individual elements, combined to form an electronic vernier, for fine indication.

5. A display system as claimed in claim 4, wherein said electronic means comprises counting and storage means for receiving signals corresponding to scale values scanned by said main element and evaluating means for receiving signals corresponding to scale values scanned by said electronic vernier and subsequently transferring the signals to said counting and storage means, said counting and storage means combining all of the signals and supplying corresponding signals to said digital display.

6. A display system as claimed in claim 1, further including means for feeding into said display system a signal which corresponds to the precise position of said feed slide relative to said guillotine blade.

7. A display system as claimed in claim 1, further including a ground-glass screen and an optical system for projecting the scale values on said fixed scale onto said ground-glass screen in an enlarged form.

8. A display system as claimed in claim 1, further including a housing on the front of said guillotine, said digital display being disposed in said housing.

9. A display system as claimed in claim 1, wherein said guillotine and said display system have independent electrical power supplies, whereby said display system can remain electrically energized when said guillotine is switched off.

* * * * *